United States Patent [19]

Larson et al.

[11] Patent Number: 5,112,655
[45] Date of Patent: May 12, 1992

[54] SOLVENT BASED TIECOATING FOR USE WITH MASTIC COATING

[75] Inventors: Gary R. Larson, Hatfield; Allen P. Marks, Richboro, both of Pa.

[73] Assignee: Rohm and Haas Company, Philadelphia, Pa.

[21] Appl. No.: 606,647

[22] Filed: Oct. 31, 1990

Related U.S. Application Data

[62] Division of Ser. No. 297,502, Jan. 13, 1989, abandoned.

[51] Int. Cl.⁵ .......................... B05D 1/36; B05D 7/00
[52] U.S. Cl. ........................... 427/407.1; 427/393.6; 524/399; 526/318.44
[58] Field of Search ................... 427/407.1, 393.6; 524/399; 526/318.44

[56] References Cited

U.S. PATENT DOCUMENTS 4,571,415 2/1986 Jordan ............................ 524/428

FOREIGN PATENT DOCUMENTS 258988 3/1988 European Pat. Off. .

Primary Examiner—Michael Lusignan

[57] ABSTRACT

A method for improving the quality of a mastic coating system by using a solvent-borne tiecoat, and a solvent-borne tiecoat composition are provided. The tiecoat is applied to a substrate in order to correct substrate deficiencies which would cause premature failure of a mastic coating applied directly to the substrate. The mastic coating is then applied to the tiecoat to yield a superior mastic coating composition.

6 Claims, No Drawings

SOLVENT BASED TIECOATING FOR USE WITH MASTIC COATING

This is a divisional of application Ser. No. 297,502, filed Jan. 13, 1989, now abandoned.

FIELD OF THE INVENTION

This invention relates to solvent-borne compositions for use as a coating or coatings, also known as tiecoats, disposed between a substrate and at least one subsequent coating. More particularly, this invention is directed to a solvent-borne tiecoat which provides improved properties to a mastic coating system when the solvent-borne tiecoat is disposed between a substrate and a mastic coating.

BACKGROUND OF THE INVENTION

Some coating applications require relatively thick films. For example, coatings to be applied to substrates such as, for example, modified bitumen single-ply roofing membranes used on industrial building roofs, are conventionally on the order of 10-40 mils (0.02-0.10 cm.) thick. Such coatings are frequently referred to as "roof mastics" although "mastic coatings" as used herein includes any such thick coating applied to a substantially horizontal surface such as, for example, a roof deck, to a substantially vertical surface such as, for example, a wall, or to other substrate surfaces. In some cases, the substrate surfaces to which it is desired to apply mastic coating(s) present problems such as, for example, difficulty in adhesion of the mastic coating to the substrate or such as, for example, the presence of highly colored bodies in or on the substrate which may migrate into and discolor the mastic coating. The tiecoats of this invention, disposed between the substrate and the mastic coating, solve such problems without unduly complicating or hindering the objective, the application of an effective mastic coating system.

DESCRIPTION OF THE PRIOR ART

U.S. Pat. No. 4,571,415 disclosed water-based coatings and caulking compositions for exterior surfaces which upon application quickly develop resistance to being washed out by inadvertant precipitation. These compositions comprise an aqueous dispersion of water-insoluble latex polymer prepared by emulsion polymerization, inorganic pigment dispersed with anionic polymer, and water-soluble salt of a multivalent complex ion having labile, volatile ligands such as zinc ammonium complex ion. The '1415 patent is directed to aqueous compositions for exterior surfaces and does not disclose or suggest compositions for use as solvent-borne tie coats.

The use of solvent-borne coatings containing solvent-soluble polymers which contain carboxyl groups has long been known in the paint and coatings art. The use of multivalent ions which interact with these carboxyl groups to "crosslink" the polymers has also been known. The art does not, however, disclose or suggest solvent-borne tiecoat compositions useful in mastic coatings systems.

It is, therefore, an object of this invention to provide a solvent-borne tiecoat disposed between a substrate and a mastic coating to solve problems which prevent the application of an effective mastic coating system.

It is an object of this invention to provide a method whereby a useful mastic coating can be applied, particularly over substrates with properties which could otherwise lead to premature failure of the mastic coating system if the mastic coating were applied directly over the substrate, through the use of an intermediate coat(s), or tiecoat(s), without unduly complicating or prolonging the application of the overall mastic coating system.

SUMMARY OF THE INVENTION

This invention is directed to a solvent-borne tiecoat composition; it is also directed to a method for improving a mastic coating system by applying a solvent-borne tiecoat to a substrate prior to applying the mastic coating.

A mastic coating system is a relatively thick coating system conventionally of a dried thickness of about 10 to about 40 mils (about 0.02 to about 0.10 cm.), applied to interior or exterior substrates such as, for example, concrete block walls or built-up roofing formed from roofing felts and asphalt or tar. The mastic coating system is comprised of at least one coating.

A substrate as used herein may be a newly formed or aged surface such as, for example, concrete, or it may be a first substrate surface freshly or previously treated or coated with at least one coating such as, for example, a re-tarred flat roof.

A solvent-borne tiecoat is applied to the substrate prior to the application of at least one mastic coating. The solvent-borne tiecoat contains at least one solvent-soluble polymer soluble in the solvent(s) used.

The solvent-soluble polymer is prepared by polymerization techniques well-known in the art. Any monomer or monomer mixture which yields a solvent-soluble polymer with a glass transition temperature (Tg) from about $-20$ C. to about 20 C. may be used to prepare the solvent-soluble polymer used in the tiecoat of this invention. For example, acrylic ester monomers including methyl acrylate, ethyl acrylate, butyl acrylate, 2-ethylhexyl acrylate, decyl acrylate, methyl methacrylate, butyl methacrylate, isodecyl methacrylate, lauryl methacrylate, isobornyl methacrylate, and eicosyl methacrylate may be used. Acrylic acid, methacrylic acid, itaconic acid, maleic acid, fumaric acid, sulfonic acid monomers, amino-functional monomers, styrene, substituted styrenes, butadiene, acrylonitrile, vinyl acetate and the like may also be used. It is required that the monomer components of the solvent-soluble polymer be selected such that the Tg of the dried polymer be from about $-20$ C to about 20 C.. It is preferred that the solvent-soluble polymer be relatively hydrophobic in nature in order to enhance the water resistance properties of the tiecoat and the overall mastic coating system. It is also preferred that the hydrophobicity of the solvent-soluble polymer be similar to that of the substrate in order to enhance the adhesion of the tiecoat to the substrate.

It is preferred that a low level of acid-containing monomer such as, for examples from about 0.5% to about 8%, based on the weight of the solvent-soluble polymer be incorporated into the polymer. The acid-containing monomers include those mentioned hereinabove. Low levels of acid-containing monomer are beneficial in maximizing the hydrophobicity of the solvent-soluble polymer, the water resistance of the tiecoat, and the water resistance and the blistering resistance of the overall mastic coating system. Higher acid levels ere, however, beneficial in providing acid functionality with which added multivalent ions can interact to provide a tack-free tiecoat. Generally, the lower Tg solvent-soluble polymer embodiments of this invention benefit from added multivalent ions and relatively higher acid-containing monomer content.

Chain transfer agents including mercaptans and halogen compounds are sometimes desirable in order to moderate the molecular weight of the solvent-soluble polymer. Preferred chain transfer agents include, for example, C4-C20 alkyl mercaptans and mercaptopropionic acid and its esters. Generally, from about 0% to about 3%, by weight of such chain transfer agents based on the weight of the dried solvent-soluble polymer, may be used.

The solvent-soluble polymer must be soluble in the solvent(s) in which it is intended to prepare the tiecoat for application to the substrate. The solvent-soluble polymer may be prepared by bulk polymerization, suspension polymerization, or by other polymerization techniques known to those skilled in the art and isolated. In these cases the solvent-soluble polymer must be dissolved in a solvent or solvent mixture in which it is soluble in order to prepare the tiecoat of this invention. However, it is preferred to prepare the solvent-soluble polymer by solution polymerization techniques in a solvent or solvent mixture in which it is soluble and to use the prepared polymer solution, optionally with other solvent(s) and coatings ingredients, to prepare the tiecoat of this invention.

The solvent(s) used in the tiecoat have been selected from among those useful for preparing an ambient air-drying solvent-borne coating. Solvents must also be selected with regard to their interaction with the substrate, in that solvents which totally dissolve the substrate may yield an inadequately distinct tiecoat. Also, solvents which do not evaporate rapidly from the applied tiecoat may lead to blistering in the mastic coating system. For example, when the tiecoats of this invention where applied to atactic polypropylene modified bitumen sheets, toluene, xylenes, n-butanol, ethanol, isopropanol, and hexanol were found to perform well, while mineral thinner attacked the substrate and methyl n-amyl ketone led to blistering of the final mastic coating system. Preferred for that substrate are n-butanol, toluene, and solvent mixtures contain substantial levels, such as for example 20 percent or more, of toluene.

This invention may optionally require a detackifying agent to be incorporated into the tiecoat. The application of the tiecoat is an additional step in the application of the overall mastic coating system. It is essential that the tiecoat rapidly become low in tack when the tiecoat is applied to substantially horizontal surfaces such as, for example, in roofing applications, so that the subsequently applied mastic coating can be promptly applied by operatives walking on the tiecoat, thereby not unduly prolonging the overall application process. In this embodiment, a tack reducing agent is essential to achieving a practical system. Inorganic and polymeric pigments are known in the art to reduce the tack of coatings. Preferred in the tiecoats of this invention is the use of soluble salts of multivalent ions as detackifying agents. Especially preferred is the use of zinc salts. Most especially preferred is the use of zinc salts at a level of about 0.2 to about 0.8 moles of zinc per mole of copolymerized acid-containing monomer incorporated into the solvent-soluble polymer.

In addition, conventional coating components such as, for example, pigments, dispersants, surfactants, thickeners, anti-foaming agents, anti-cratering agents, colorants, waxes, and the like, may be added.

Applications of the tiecoat may be made to various substrates such as, for example, asphaltic or bituminous surfaces, cement/asbestos shingles or roofing panels, urethane foam roofing panels, deteriorated concrete, and the like. The tiecoat may be applied by conventional techniques such as, for example, by brush, mop, roller, airless spray, and the like.

The following examples are intended to illustrate the tiecoat composition and the method of improving the quality of a mastic coating system, to which this invention is directed. They are not intended to limit the invention as other applications of the invention will be obvious to those of ordinary skill in the art.

EXAMPLE 1

Preparation of solvent-soluble polymer

Preparation of Sample A. To a 5 liter 4-necked round bottom flask fitted with a mechanical stirrer and a water-cooled condenser was added 261 g. of n-butanol. The n-butanol was heated to reflux (ca. 120 C.) with a N2 sparge in the flask. A monomer mix consisting of 763.5 g. butyl acrylate, 763.5 g. isodecyl methacrylate, 783 g. methyl methacrylate, and 121.6 g. acrylic acid was prepared. A initiator solution consisting of 24.31 g. of 2',2'-azobis-(2-methyl butyronitrile) (Vazo 67) dissolved in 300 g. of n-butanol was prepared. To the refluxing n-butanol in the flask was added 243 g. of the monomer mix and 33 g. of the initiator solution. On the addition of these two solutions the temperature of the mixture in the flask dropped to 110 C. and then increased to 125 C. due to the exotherm of the polymerizing mixture. Two minutes after the peak exotherm temperature of 125 C. was reached, the addition of the remainder of the monomer mix and the remainder of the initiator solution was begun. These two solutions were added at a uniform rate over a period of three hours, which maintained the temperature at the reflux temperature of ca. 120 C.. After completion of this addition a solution of 24.31 g. of Vazo 67 dissolved in 300g. n-butanol was added over a period of 30 minutes. After completion of this addition, a solution of 24.31 g. of Vazo 67 dissolved in 120 g. n-butanol was added over a period of 15 minutes. The reaction mixture was held for 30 minutes. Dilution solvent, 400 g. n-butanol, was added to the reaction mixture. The reaction mixture was cooled and filtered through cheesecloth. The solids content of the reaction mixture was 63.6% (theoretical: 65.0%) and the Brookfield viscosity was 16,000 cps. The calculated Tg of the solvent-soluble polymer was −8 C..

EXAMPLE 2

Preparation of additional solvent-soluble polymers

Samples B, C, D, E, F, G, H, I, J, K. Ten additional solvent-souble polymers were made according to the procedure of Example 1 using different monomer mixes, with the results presented below.

| Sample | Monomer Mix (all quantities in grams) | | | | | | | | | |
|---|---|---|---|---|---|---|---|---|---|---|
| | B | C | D | E | F | J | G | H | I | K |
| BA | 763.5 | 432.8 | 843.8 | 522.8 | 1050.4 | 1547 | — | 1270.3 | — | 907 |
| IDMA | 763.5 | 953.2 | 486.3 | 1215.8 | 600.6 | — | 1466.2 | — | 1816.4 | 539.8 |
| MMA | 783 | 924.0 | 979.9 | 571.4 | 659.0 | 735 | 843.8 | 1039.7 | 493.6 | 863.2 |
| AA | 121.6 | 121.6 | 121.6 | 121.6 | 121.6 | 121.6 | 121.6 | 121.6 | 121.6 | 121.6 |
| | 2431.6 | 2431.6 | 2431.6 | 2431.6 | 2431.6 | 2431.6 | 2431.6 | 2431.6 | 2431.6 | 2431.6 |

| | Characterization of samples | | |
|---|---|---|---|
| Sample | Determined % Solids | Brookfield Viscosity (cps) | Calculated $T_g$ (°C) |
| B | 63.7 | 16,200 | −8 |
| C | 65.0 | 37,750 | −2 |
| D | 65.0 | 26,250 | +1 |
| E | 63.11 | 8,200 | −16 |
| F | 63.1 | 6,000 | −16 |
| G | 67.7 | — | +1 |
| H | 69.1 | — | +1 |
| I | 64.5 | 13,900 | −16 |
| J | 69.4 | — | −16 |
| K | 65.0 | 16,200 | −7 |

EXAMPLE 3

Preparation of detackified tiecoat

Sample AA. To 225 g. of Sample A was added 36 g. of n-butanol with stirring. A solution of 10.68 g. zinc acetate dihydrate, 18.15 g. methanol, and 2.82 g. of a 28% aqueous solution of ammonia in water was prepared by stirring until a clear solution was formed. The zinc-containing solution was added to the solution of Sample A with stirring.

EXAMPLE 4

Preparation of additional detackified tiecoats

Samples BB, CC, DD, EE, FF, GG, HH, II, JJ, KK. Ten additional detackified tiecoats were prepared according to Example 3, using the following ingredients.

| Sample | Solvent Soluble Polymer[1] | g. of n-butanol | g. of Zn(OAc)₂·2H2O | g. of MeOH | g. of 28% NH4OH |
|---|---|---|---|---|---|
| BB | B | 36.3 | 10.69 | 18.17 | 2.82 |
| CC | C | 41.7 | 10.91 | 18.55 | 2.88 |
| DD | D | 41.7 | 10.91 | 18.55 | 2.88 |
| EE | E | 34 | 10.59 | 18.0 | 2.80 |
| FF | F | 34 | 10.59 | 18.0 | 2.80 |
| GG | G | 52.8 | 11.36 | 19.3 | 3.00 |
| HH | H | 98.5 | 11.60 | 19.7 | 3.06 |
| II | I | 39.5 | 10.82 | 18.40 | 2.86 |
| JJ | J | 53.4 | 11.65 | 19.80 | 3.08 |
| KK | K | 41.7 | 10.91 | 18.55 | 2.88 |

[1]225 g. of the solvent-soluble polymer of Example 2 was used in each case

COMPARATIVE EXAMPLE 1

Preparation of mastic coating

Preparation of mastic coating 1. The following ingredients were combined and ground for 15 minutes on a high sped Cowles disperser.

| Water | 152.52 g. |
|---|---|
| Hydroxyethyl cellulose (Natrosol ® 250 MXR) | 4.37 g. |
| Anionic dispersant (30% T.S.) | 4.96 g. |
| (Tamol ® 850) | |
| Ethylene glycol | 25.4 g. |
| Defoamer (Nopco ® NXZ) | 1.98 g. |
| KTPP | 1.49 g. |
| Calcium carbonate (Duramite ®) | 422.72 g. |
| Titanium dioxide (TiPure ® R-960) | 70.37 g. |
| Zinc oxide (Kadox ® 515) | 46.95 g. |

The grind was let down at low speed with the following ingredients:

| Latex polymer (55% solids) (Rhoplex ® E-1791) | 470.59 g. |
|---|---|
| Texanol ® coalescent | 7.24 g. |
| Preservative (Skane ® M-8) | 1.00 g. |
| Defoamer (Nopcop ® NXZ) | 1.98 g. |
| Aqueous Ammonia (28%) | 0.99 g. |

COMPARATIVE EXAMPLE 2

Preparation of mastic coating

Preparation of mastic coating 2. The following ingredients were ground on a high speed Cowles mixer for 15 minutes. (all quantities in grams)

| Water | 152.5 |
|---|---|
| Anionic Dispersant (30% Solids) (Tamol ® 850) | 4.8 |
| Defoamer (Nopco ® NZX) | 1.9 |
| KTPP | 1.4 |
| Alumina Trihydrate (Alcoa ® C-330) | 327.6 |
| Titanium Dioxide (Tipure ® R-960) | 70.4 |
| Antimony Trioxide (Thermoguard S) | 25.9 |
| Decabromodiphenyl oxide (FR-300 BA) | 51.8 |
| Zinc Oxide (Kadox ® 515) | 46.9 |
| Ethylene glycol | 24.4 } premixed |
| Hydroxyethyl Cellulose (Natrosol ® 250 MXR) | 4.2 |

The impeller speed was reduced to slow and the impeller positioned just below the surface of the grind. The following ingredients were added.

| Latex polymer (55% Solids) (Rhoplex ® E-1791) | 470.6 |
|---|---|
| Defoamer (Nopco ® NXZ) | 1.9 |
| Coalescent | 6.9 |

-continued

| | |
|---|---|
| (Texanol ® ) Preservative (Skane ® M-8) | 2.1 |
| Aqueous Ammonia (28% NH3) | 1.0 |

Upon additive of all additives, the impeller was repositioned for good agitation throughout and stirring continued for 5 minutes.

EXAMPLE 5

Effect of tiecoat Tg on stain blocking

To plaques of Brai (U.S. Intec Corp.) APP (atactic polypropylene) modified bitumen was applied a tiecoat with a #40 Gardner drawdown rod to yield a dry coat approximately 3 mils thick. The coating was allowed to dry for two to four hours at ambient conditions. The coating was topcoated with a roof mastic using a Gardner knife to yield a 10 mil thick dry film. After allowing each sample to dry for 24 hours under ambient conditions the samples were placed in an oven held at 50° C. for two weeks. Color values were measured with a Minolta Chroma Meter CR-231, calibrated with a white standard in the "L*a*b*" mode. The "b" values are a measure of yellowness with 0=absolute whiteness, 6=barely visible color, and 30=light brown.

TABLE 5.1

| | Stain Blocking results from Example 5 | | |
|---|---|---|---|
| Tiecoat | Tg (Calc.) | "b"/Comp. Ex. 1 Mastic Coating topcoat | "b"/Comp. Ex. 2 Mastic Coating topcoat |
| FF | −16° C. | 9.3 | 8.8 |
| KK | −7° C. | 4.7 | 3.9 |
| DD | 1° C. | 0.9 | 4.2 |
| None | — | 17–18 | 14 |

The tiecoats of this invention reduced the yellowing apparent on the surface of the mastic coatings exposed to accelerated weathering conditions. The Tg of the solvent-soluble polymer exerts a principal influence on stain blocking with Tgs greater than about −20° C. being required.

EXAMPLE 6

Mastic coating systems properties

The balance of properties required in a mastic coating system includes blister resistance, adhesion and low temperature flexibility. When the tiecoat of the invention is used low tack of the tiecoat and its utility in contributing other properties such as, for example, bleed-through resistance when the mastic is applied to modified bitumen substrates is required.

Blister resistance: Tiecoats and mastic coatings were applied as in Example 5. The tiecoated and subsequently topcoated APP modified bitumen plaque was cut to approximately 4 in. by 4 in. in size. After 24 hours air dry at ambient conditions the samples were placed under 1 inch of deionized water and examined for blistering and delamination at intervals ranging from 1 day to 28 days. The results are expressed as the size of the blisters(10=very small, 2=large) and density of the blisters(H=heavy; M=moderate; L=light)/the number of days until the first blisters appeared.

Adhesion: Tiecoat and mastic coatings were applied as in Example 5. After the tiecoat was coated with the mastic coating, a 1 in. wide airplane cloth strip was placed over the wet film and the coating was painted over the cloth with a paint brush to wet out the cloth. Dry adhesion was measured after drying for three weeks at room temperature. Wet adhesion was measured after drying for two weeks at room temperature and then soaking in tap water for one week. The cloth strip was pulled at 180. in a Tensile tester and the force reported in lbs./in.. The mode of failure was indicated as A=adhesive failure; C=cohesive failure; IC=intercoat failure; FD=fabric delamination.

Low Temperature Flexibility: Tiecoat and mastic coatings were applied as in Example 5. After topcoating with the mastic coating the Brai plaque was cut to approximately 4 in. by 4 in.. It was allowed to air dry for one week and then placed in a variable temperature cold box. When temperatures equilibrated the plaque was bent over a sequence of mandrels of decreasing size (4 in., 2 in., 1 in., 0.5 in.) and then finally folded 180 degrees. Temperatures used were 75° F., 45° F., 30° F. P=pass; F=fail.

Tack: A tiecoat was applied to Brai APP modified bitumen using a #40 Gardner drawdown rod. After 2-4 hours dry at ambient conditions, tack to the hand touch was rated as excellent(E)=no tack at all; very good(VG)=slight tack felt with entire palm; good(G)=slight tack felt with finger; fair(F)=heard "kiss" with palm; or poor(P)=felt sticky.

TABLE 6.1

RESULTS OF TESTING ON TIECOATS AND OVERALL MASTIC SYSTEMS.

| | | BLISTER RESISTANCE Topcoated with | | BLEED-THROUGH "b" Topcoated with | | | ADHESION (lb/in) | |
|---|---|---|---|---|---|---|---|---|
| Tiecoat | Tack | (91-1) Compex. 1 | (91-4) Compex. 2 | (91-1) Compex. 1 | (91-4) Compex. 2 | Flexibility | Dry Mode | Wet Mode |
| A | VG | 10L/7D | NONE/28D | 7.6 | 6.2 | F-2"/45F | .9A | .9FD/A |
| AA | E | 10L/7D | 10L/7D | 5.7 | 6.2 | F"2.45F | .5A | .2A |
| B | VG | NONE/28D | 10L/D28 | 5.6 | 6.0 | F4"/30F | .6A | .8A |
| BB | E | 10L/3D | 8M/7D | 5.8 | 6.0 | F2"/45F | .6A | .2A |
| C | E | 10L/7D | NONE/28D | 2.3 | 4.0 | F4"/75F | .3A | .4A |
| CC | E | 6M/7D | 10M/7D | 1.7 | 3.2 | F4"/75F | .5A | .05A |
| D | VG+ | 10L/13D | 10L/13D | 3.0 | 3.9 | F180/75F | .5A | .7A |
| DD | E | 8M/7D | 6L/7D | .9 | 4.2 | F2"/75F | .4A | .12A |
| E | G− | NONE/28D | NONE/28D | 7.5 | 7.1 | F4"/30F | .7A | .5FD/A |
| EE | E | 10L/13D | 10L/7D | 10.1 | 8.1 | F4"/30F | .6A | .5A |
| F | P | 10M/7D | NONE/28D | 7.9 | 10.6 | F2"/30F | .6A | 1.4FD/A |
| FF | VG | 10M/13D | 10L/28D | 9.3 | 8.8 | F2"/30F | .6A | .6A |
| GG | E | 8M/7D | 8M/14D | 4.6 | 5.5 | F2"/75F | .8A | .03A |
| H | E | 8M/28D | 8L/14D | 5.6 | 6.9 | F180/75F | .8A | .03A |
| HH | E | 8M/3D | 8M/3D | 5.8 | 6.4 | F180/75F | .7A | .04A |
| I | E | NONE/28D | NONE/28D | 10.3 | 12.1 | F180/45F | .8A | .9A/FD |

TABLE 6.1-continued

RESULTS OF TESTING ON TIECOATS AND OVERALL MASTIC SYSTEMS.

| | | BLISTER RESISTANCE Topcoated with | | BLEED-THROUGH "b" Topcoated with | | | ADHESION (lb/in) | |
|---|---|---|---|---|---|---|---|---|
| | | (91-1) | (91-4) | (91-1) | (91-4) | | | |
| Tiecoat | Tack | Compex 1 | Compex 2 | Compex 1 | Compex 2 | Flexibility | Dry Mode | Wet Mode |
| H | E | 8L/24D | 8M/14D | 7.7 | 11.4 | F180/45F | 1.1A | .2A |
| J | G- | 8M/3D | 8M/3D | 9.8 | 15.5 | P180/30F | .6A | .3FD/A |
| JJ | E | NONE/28D | 8L/7D | 10.0 | 12.5 | F180/30F | .5A | .1FD/A |
| K | G | 10L/28D | 10M/7D | 5.9 | 5.3 | F2"/45F | .8A | .9FD/A |
| KK | E | 8L/7D | 8L/1D | 4.7 | 3.9 | F2"/45F | .6A | .15A |
| I | VG- | NONE/28D | 10M/13D | 9.6 | 8.8 | F180/75F | 1.0A | .5FD/A |
| II | E | 8M/7D | 8M/13D | 9.1 | 11.7 | F1"/75F | .8AC/1C | 0.1A |

EXAMPLE 7

Effect of solvent-soluble polymer backbone on mastic coating system properties

Repeat preparations of sample J (designated sample J') and of sample I (designated sample I') were prepared according to Example 2, with the exception that the dilution solvent, n-butanol, was not added at the reaction end, which produced samples with a theoretical solids of 70%.

TABLE 7.1

COMPARISON OF BA TO IDMA IN SOLVENT-SOLUBLE POLYMER BACKBONE

| SAMPLE[1] | J' | | I' | |
|---|---|---|---|---|
| COMPOSITION | BA/MMA/AA | | IDMA/MMA/AA | |
| SOLVENT | n-BUTANOL | | n-BUTANOL | |
| DETACKIFIER | NONE | ZnOAc | NONE | ZnOAc |
| Wt % Solid | 70.7 | 65.5 | 70.9 | 65.5 |
| Tack (After 4 Hours) | | | | |
| Ext (130 F.): | P- | VG | VG | E- |
| Ovn (205 F): | P | VG- | G | E- |
| Blister Resistance | (Comp. Ex 1 Topcoat) | | | |
| 1 Day: | NONE | NONE | NONE | NONE |
| 8 Days: | MOD | LIGHT | NONE | NONE |
| 14 Days: | MOD | LIGHT | NONE | NONE |
| 21 Days: | MOD | LIGHT | NONE | NONE |
| 28 Days: | MOD | LIGHT | NONE | NONE |
| ADHESION (lb/in) | (Tiecoat only) | | | |
| Dry: | 2.2 | 0.6 | 2.3 | 1.1 |
| Wet: | 0.8 | 0.6 | 1.6 | 1.1 |

[1]Samples J' and I' each have a calculated Tg = -16 C

The tiecoats of this invention provide useful mastic coating systems. The IDMA copolymers with zinc detackifier provide tiecoats and resultant mastic coating systems with an excellent balance of tack, blister resistance, and adhesion, and exhibit performance superior to the less hydrophobic BA composition.

What is claimed is:

1. A method for improving the quality of a mastic coating system comprising:
   (a) forming a tiecoat composition comprising at least one solvent-soluble polymer, wherein said polymer has a glass transition temperature from about −20 C. to about 20 C.;
   (b) applying said tiecoat composition to a substrate surface; and
   (c) applying a mastic coating to said tiecoat composition coated onto said surface.

2. The method of claim 1 wherein said solvent-soluble polymer is prepared from a monomers mixture comprising an ethylenically unsaturated acid-containing monomer at a level from about 0.5% to about 8.0% based on the weight of said monomer mixture.

3. The method of claim 2 wherein said monomer mixture further comprises at least about 20% of a hydrophobic monomer based on the weight of said monomer mixture, wherein said hydrophobic monomer is selected from the group consisting of $C_8$-$C_{20}$ alkyl acrylates and $C_8$-$C_{20}$ alkyl methacrylates.

4. The method of claim 1 wherein said tiecoat composition further comprises the salt of a multivalent ion.

5. The method of claim 4 wherein aid multivalent ion is zinc.

6. The method of claim 1 wherein said substrate surface is an asphaltic bitminous surface.

* * * * *